United States Patent
Johnston

[11] 3,895,455
[45] July 22, 1975

[54] ILLUMINATED FISHING LURES

[76] Inventor: Charles James Johnston, 1 Killiney Ter., Breffni Rd., Sandycove, Ireland

[22] Filed: June 1, 1973

[21] Appl. No.: 366,242

[30] Foreign Application Priority Data
Nov. 17, 1972  Ireland.............................. 1588/72

[52] U.S. Cl. ................................................ 43/17.6
[51] Int. Cl. ............................................ A01k 85/00
[58] Field of Search ........................... 43/17.6, 17.5

[56] References Cited
UNITED STATES PATENTS

| | | | |
|---|---|---|---|
| 1,380,876 | 6/1921 | Warden | 43/17.6 |
| 1,422,841 | 7/1922 | Dey | 43/17.6 X |
| 1,529,459 | 3/1925 | Wunderlin | 43/17.6 |
| 2,709,984 | 6/1955 | Marks | 43/17.5 X |
| 2,754,610 | 7/1956 | Carlson | 43/17.6 |
| 3,077,046 | 2/1963 | Murray | 43/17.6 |
| 3,576,987 | 5/1971 | Voight et al. | 43/17.6 UX |

FOREIGN PATENTS OR APPLICATIONS
21,785  10/1911  Norway................................ 43/17.6

*Primary Examiner*—Louis G. Mancene
*Assistant Examiner*—Daniel J. Leach
*Attorney, Agent, or Firm*—Young & Thompson

[57] ABSTRACT

A fishing lure having a tubular body providing a housing for receiving a self-contained light source, apertures being provided in the tubular body to enable the light source to emit light through the lure from the interior of the body.

3 Claims, 3 Drawing Figures

ILLUMINATED FISHING LURES

The present invention concerns illuminated fishing lures.

According to the invention, there is provided a fishing lure, a self-contained light source for insertion in or application to the fishing lure, and means for securing the light source in or on the fishing lure. The lure advantageously has a housing for receiving the light source and apertures are provided in the lure to enable the light source to emit light through the lure from the interior of the housing.

In a preferred embodiment of the invention, the lure is generally tubular or sleeve shaped and has a housing for receiving a linear or rod shaped light source, one end of the tube being closed and the other end having means for retaining the light source when in position in the housing.

Advantageously, the light source is of the kind described in U.S. Pat. No. 3,576,987 and is a self-contained light unit comprising an outer flexible cylindrical light transmitting container for one reactive composition, and an inner rigid container for another reactive composition, so that on flexing the outer container, the inner container is broken to enable the two reactive composition to mix and produce a reaction providing chemiluminescent light which is visible through the outer container.

Figure 1:
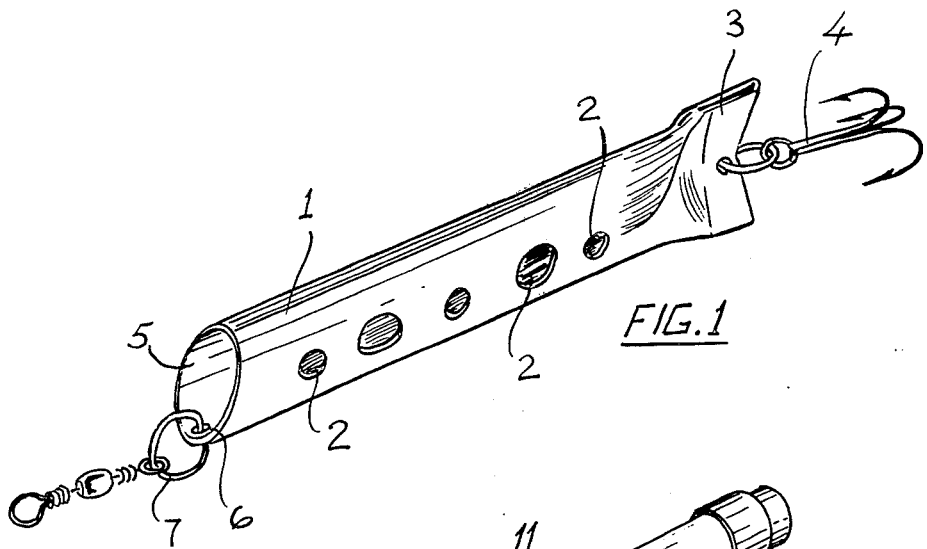
Figure 2:
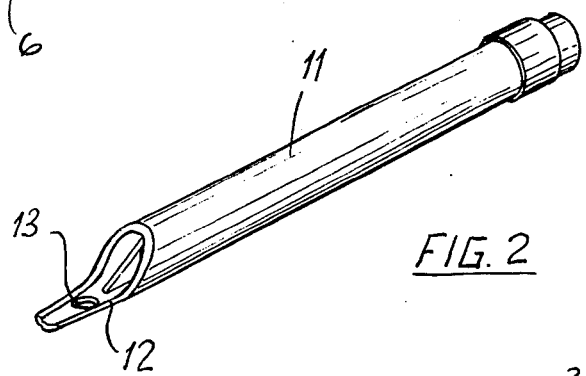
Figure 3:
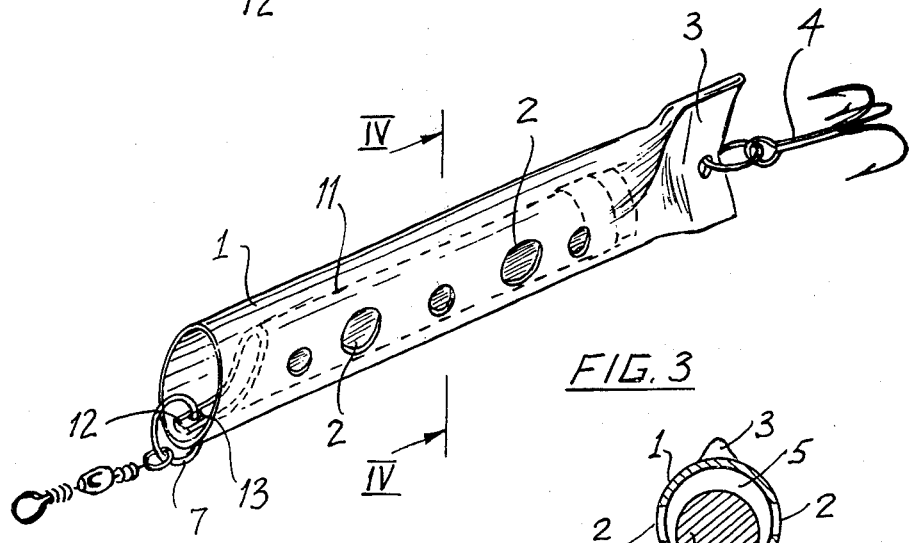
Figure 4:
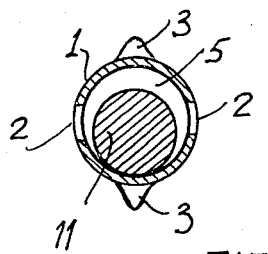

The invention will hereinafter be described more particularly with reference to the accompanying drawings which illustrate, by way of example only, a preferred embodiment of the invention. In the drawings, FIG. 1 is a perspective view of the lure, without the light source, FIG. 2 is a perspective view of the light source, FIG. 3 is a view corresponding to FIG. 1, in which the light source shown in FIG. 2 is housed in the lure, and FIG. 4 is a cross-sectional view on line IV—IV of FIG. 3.

Referring to the drawing, the fishing lure comprises a tubular element 1 provided with a plurality of apertures 2. The tubular element 1 is closed at one end 3 to which a hook 4 is connected. At the other end the tubular element 1 is open to provide an aperture defining an entrance to a housing 5 in the interior of the tubular element 1. Adjacent the aperture is an eye 6 through which passes a ring 7 to which conventional fishing tackle is attached for drawing the lure through the water at the end of a fishing line.

Into the housing 5 is adapted to fit a linear or rod-shaped light source 11. At one end thereof, the light source has a projection 12 providing an eye 13 which, when the light source is in position in the housing 5, as shown in FIG. 3, is in alignment with the eye 6 in the tubular element 1. The ring 7, which is easily removable to allow the light source to be inserted into the housing, then passes through both eyes 6 and 13 to secure the light source in the tubular element.

I claim:

1. A fishing lure comprising an apertured tubular housing for receiving a linear replaceable self-contained light source and for enabling the light source to emit light through the lure from the interior of the housing, one end of said housing being closed to simulate a fish tail, a fish hook connected to said one end, connection means at the other end of said housing for releasably retaining a linear replaceable self-contained light source in said apertured tubular housing and for connecting said fishing lure to a fishing line, said connection means comprising a ring connector which passes through an aperture in the housing, and a said light source in said housing and having a tapered extension in which there is provided an aperture, said ring connector passing also through said aperture in the said tapered extension.

2. A fishing lure as defined in claim 1, wherein said light source comprises an outer flexible cylindrical light transmitting container for one reactive composition, and an inner rigid container for another reactive composition, so that on flexing the outer container, the inner container is broken to enable the two reactive compositions to mix and produce a reaction providing chemiluminescent light which is visible through the outer container.

3. A fishing lure as defined in claim 1, said housing being open at said other end.

* * * * *